US009033407B2

(12) United States Patent
Ikeda et al.

(10) Patent No.: US 9,033,407 B2
(45) Date of Patent: May 19, 2015

(54) VEHICLE HOOD STRUCTURE

(75) Inventors: Koki Ikeda, Toyota (JP); Seiho Yonezawa, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 13/637,226

(22) PCT Filed: Mar. 26, 2010

(86) PCT No.: PCT/JP2010/055331
§ 371 (c)(1),
(2), (4) Date: Sep. 25, 2012

(87) PCT Pub. No.: WO2011/118016
PCT Pub. Date: Sep. 29, 2011

(65) Prior Publication Data
US 2013/0015682 A1    Jan. 17, 2013

(51) Int. Cl.
*B60R 21/34*    (2011.01)
*B62D 25/10*    (2006.01)
*B62D 29/00*    (2006.01)

(52) U.S. Cl.
CPC .............. *B62D 25/105* (2013.01); *B60R 21/34* (2013.01); *B60R 2021/343* (2013.01); *B62D 29/008* (2013.01)

(58) Field of Classification Search
CPC   B60R 21/34; B60R 2021/343; B62D 29/008; B62D 25/105
USPC ............ 296/193.11, 187.04; 180/69.1, 69.22, 180/274
See application file for complete search history.

(56) References Cited

U.S. PATENT DOCUMENTS

| 7,810,877 | B2* | 10/2010 | Ishitobi | 296/193.11 |
| 7,997,642 | B2* | 8/2011 | Rocheblave et al. | 296/193.11 |
| 2008/0088154 | A1 | 4/2008 | Rocheblave et al. | |
| 2009/0195031 | A1 | 8/2009 | Ishitobi | |
| 2010/0019540 | A1 | 1/2010 | Fujimoto | |

FOREIGN PATENT DOCUMENTS

| CN | 101068705 | 11/2007 |
| EP | 1 829 769 A1 | 9/2007 |

(Continued)

OTHER PUBLICATIONS

International Search Report Issued May 25, 2010 in PCT/JP10/55331 Filed Mar. 26, 2010.

(Continued)

*Primary Examiner* — Dennis H Pedder
(74) *Attorney, Agent, or Firm* — Oblon, McClelland, Maier & Neustadt, L.L.P.

(57) ABSTRACT

A hood structure that is for a vehicle and that can cause an increase in energy absorption performance when colliding with a collided object. An undulating section wherein beads and concavities are provided in alternation along the widthwise direction of the hood and that has a wavy shape in a cross sectional view is formed at nearly the entire central region of a hood inner panel. In the cross section of the wavy shape of the undulating section, the widthwise measurement between the peaks of the beads that are formed on both adjacent sides of any given bead aside from the two on the ends among the plurality of beads is set in a manner so as to be smaller than 165 mm, which is the outer diameter of a head impactor that simulates the head of a pedestrian.

10 Claims, 16 Drawing Sheets

(56) References Cited

FOREIGN PATENT DOCUMENTS

| | | |
|---|---|---|
| JP | 2003 205866 | 7/2003 |
| JP | 2003-252246 | 9/2003 |
| JP | 2004-26120 | 1/2004 |
| JP | 2004-58973 | 2/2004 |
| JP | 2004-359114 | 12/2004 |
| JP | 2006 298013 | 11/2006 |
| JP | 2008 24192 | 2/2008 |
| KR | 2007-0085595 A | 8/2007 |
| WO | 2006 059724 | 6/2006 |

OTHER PUBLICATIONS

Extended European Search Report issued Jul. 15, 2013 in Patent Application No. 10848409.8.

* cited by examiner

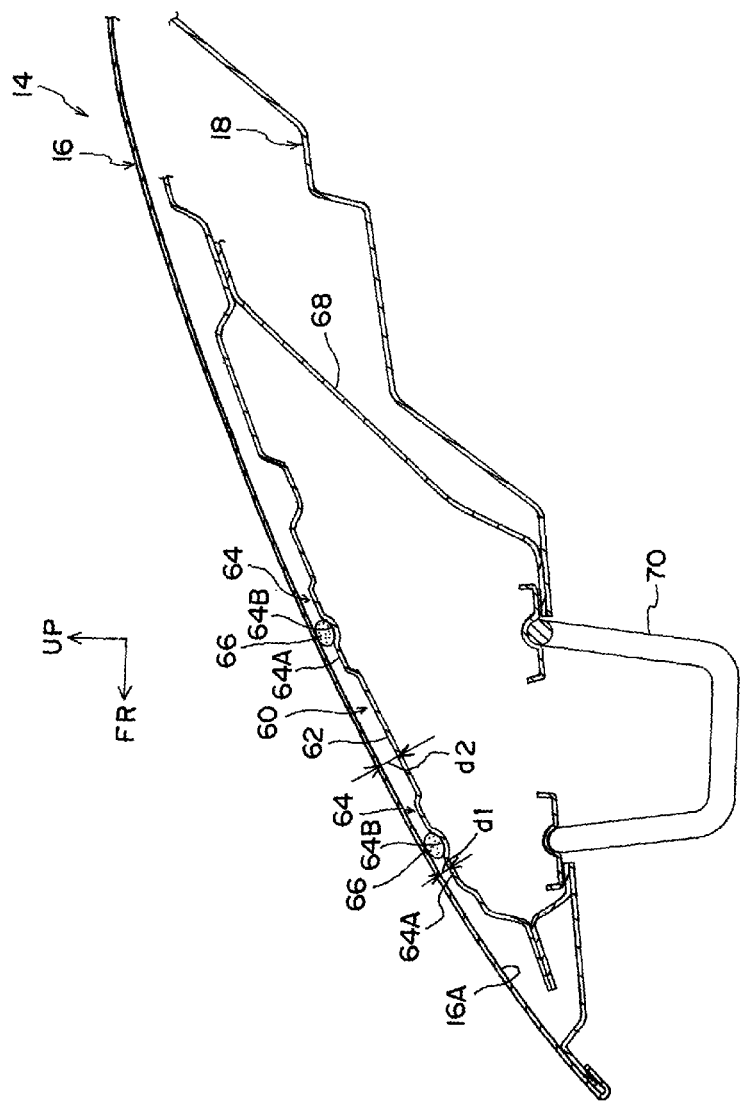

VEHICLE HOOD STRUCTURE

TECHNICAL FIELD

The present invention relates to a vehicle hood structure to be applied to a vehicle such as an automobile.

BACKGROUND ART

Vehicle hood structures are known with a hood inner panel joined to a hood outer panel. Sometimes aluminum alloys are employed for the hood outer panel and the hood inner panel in order to reduce the weight of the hood structure. In such structures, there are cases in which, from the perspective of pedestrian protection, plural beads are formed parallel to each other with their length directions along the vehicle body front-rear direction so as to form a wavy pattern. In such hood inner panels, structures have been applied in which, for example, wavelength p of the wavy inner is set, with reference to roughly the external diameter of a head, at a value in this region. As a result, during a head impact the head is supported by approximately a single wave (for example, refer to paragraph [0070] of Patent Document 1).
Patent Document 1: JP-A No. 2003-205866

DISCLOSURE OF INVENTION

Technical Problem

However, in such structures, there is room for improvement in securing the rigidity of the hood outer panel since there is a large interval between locations at which the hood outer panel is supported by the hood inner panel. Namely, it is thought that by increasing the rigidity of the hood outer panel the amount of energy absorbed by the hood outer panel at an initial impact period would be made greater than with known structures. There is also room for improvement in bringing forward the timing at which an impacting body (a head impactor) contacts the hood inner panel through the hood outer panel when the impacting body impacts between plural beads from above. Namely, it is thought that the contribution made by the hood inner panel to energy absorption during the initial impact period could be made greater than with known structures by bringing forward the timing at which the impacting body contacts the hood inner panel through the hood outer panel. There is also room for improvement from the perspective of shortening the duration during which the top portion of only a single bead deforms when for example the impacting body impacts the single bead top portion from above. Namely, it is thought that large cross-sectional deformation can be made to occur less readily than in known structures by shortening the duration during which the top portion of only a single bead deforms. There is room for improvement from the perspective of increasing the amount of energy absorbed by the hood in such known structures in such a manner.

In consideration of the above circumstances, the present invention is directed towards providing a vehicle hood structure capable of raising the energy absorption capability during impact by an impacting body.

Solution to Problem

A vehicle hood structure according to a first aspect of the present invention includes: a hood outer panel configuring an outer sheet of the hood; and a hood inner panel configuring an inner sheet of the hood, the hood inner panel disposed to the hood bottom side with respect to the hood outer panel and joined to the hood outer panel; wherein the hood inner panel is formed with a wavy section configured with a waveform profile provided with protrusion portions that have a profile protruding towards the hood outer panel side alternating with concave portions that have a concave profile on the hood outer panel side; wherein in a cross-section of the waveform profile, a width dimension between top portions of the protrusion portions formed respectively adjacent on the two sides of a given protrusion portion out of the plurality of the protrusion portions other than the two end protrusion portions is set to be smaller than an external diameter (165 mm) of a head impactor modeled on a pedestrian head; and wherein the waveform profile of the wavy section has a wavelength p set such that 70 mm≤p≤88 mm.

According to the vehicle hood structure of the first aspect of the present invention, the hood inner panel configuring the hood inner sheet is disposed to the hood bottom side with respect to the hood outer panel configuring the hood outer sheet and is joined to the hood outer panel. In the wavy section formed to the hood inner panel the protrusion portions that have a profile protruding towards the hood outer panel side are provided alternating with the concave portions that have a profile concave on the hood outer panel side. The hood inner panel accordingly has comparatively high rigidity, and absorbs energy expended for example in elastic deformation.

In such a cross-section of the waveform profile, the width dimension between the top portions of the protrusion portions formed respectively adjacent on the two sides of the given protrusion portion from the plural protrusion portions other than the two end protrusion portions is set to be smaller than the external diameter (165 mm) of the head impactor modeled on a pedestrian head. The separation between support to the hood outer panel from the hood inner panel is accordingly narrower, making it easy to secure rigidity of the hood outer panel. When the rigidity of the hood outer panel is raised the energy absorption amount by the hood outer panel during the initial impact period is accordingly also greater. When for example the impacting body of the head impactor impacts the hood outer panel at the top side between the top portions of the hood inner panel, the head impactor makes contact with and is supported by the hood inner panel, through the hood outer panel, at a relatively early stage after the hood outer panel has started to bow. The contribution made by the hood inner panel to energy absorption is thereby raised during the initial impact period. Furthermore, even in cases for example in which the head impactor impacts the hood outer panel at the top side of a single top portion of the hood inner panel, the head impactor makes contact with and is supported by plural top portions through the hood outer panel at least during the later impact period. The duration during which only the single protrusion portion bows is thereby shortened, suppressing sectional deformation of the protrusion portion, and enabling the energy absorption amount during the later impact period to be raised. Further, the wavelength p of the waveform profile of the wavy section is also set such that 70 mm≤p≤88 mm. Hence in the wavy section the height of the waveform profile can be achieved with press forming while still setting the wavelength p of the waveform profile short, enabling the rigidity to be increased further. Securing the rigidity of the wavy section also enables the rigidity of the hood outer panel supported by the wavy section to be raised, and in combination with bringing forward the timing at which the hood inner panel contributes to energy absorption, high energy absorption is achieved from the initial impact period of the head impactor. Securing the rigidity of the wavy section makes it more difficult for cross-sectional deformation of the hood inner panel to occur, such that high energy absorption is also achieved in the later impact period of the head impactor. The pedestrian protection capability provided by the hood can accordingly be increased further.

A second aspect of the present invention is the vehicle hood structure according to the first aspect wherein a flattened portion is formed to the top portion of each of the protrusion portions, and in the cross-section of the waveform profile the sum of width dimensions of three portions, these being the flattened portion and the concave opening portions respectively formed at the two sides of the flattened portion and connected to the two sides of the flattened portion, is set smaller than the external diameter (165 mm) of the head impactor.

According to the vehicle hood structure of the second aspect of the present invention, due to the flattened portions being formed to the top portions of the protrusion portions, the section modulus of the hood inner panel can be raised in comparison to cases in which flattened portions are not formed to the top portions of the protrusion portions. In the cross-section of the waveform profile the sum of width dimensions of three portions, these being the flattened portion and the concave opening portions respectively formed at the two sides of the flattened portion and connected to the two sides of the flattened portion (namely the sum of each width dimension of the flattened portion and the concave opening portions at the two sides of the flattened portion), is set smaller than the external diameter (165 mm) of the head impactor. Hence when the impacting body impacts at the top side of the hood inner panel through the hood outer panel, the hood inner panel deforms while stably supporting the impacting body through the hood outer panel, achieving energy absorption. The energy absorption amount achieved by the hood inner panel is thereby increased.

A third aspect of the present invention is the vehicle hood structure according to the first aspect or the second aspect, wherein a wavelength p of the waveform profile in the wavy section is set such that 70 mm≤p≤82.5 mm.

A fourth aspect of the present invention is the vehicle hood structure of any one of the first aspect to the third aspect wherein a weakened portion is formed in a bottom portion of the concave portion.

According to the vehicle hood structure of the fourth aspect of the present invention, the weakened portion is formed in the bottom portion of the concave portion, and so the hood inner panel deforms comparatively easily due to the weakened portion when the impacting body has impacted the hood and the hood inner panel has made contact with a member below the hood inner panel.

A fifth aspect of the present invention is the vehicle hood structure of any one of the first aspect to the fourth aspect, wherein the protrusion portions are formed along a direction parallel to the hood front-rear direction or a direction at an angle to the hood front-rear direction.

According to the vehicle hood structure of the fifth aspect of the present invention, the protrusion portions are formed along a direction parallel to the hood front-rear direction or a direction at an angle to the hood front-rear direction. The hood inner panel therefore has a higher rigidity in the hood front-rear direction or the direction at an angle to the hood front-rear direction. The rigidity of the hood inner panel to counter impact of the impacting body is thereby raised, and the energy absorption amount achieved by the hood inner panel is increased.

A sixth aspect of the present invention is the vehicle hood structure of any one of the first aspect to the fourth aspect wherein the protrusion portions are formed in a concentric circle pattern centered on a central section side of the hood as seen in plan view or are formed in a pattern radiating out from the central section side.

According to the vehicle hood structure of the sixth aspect of the present invention, the protrusion portions are formed in a concentric circle pattern centered on the central section side of the hood as seen in plan view or are formed in a pattern radiating out from the central section side. The rigidity of the hood inner panel to counter impact of an impacting body is therefore raised. The energy absorption amount achieved by the hood inner panel is accordingly increased when the impacting body impacts the hood inner panel at the top side through the hood outer panel.

A seventh aspect of the present invention is the vehicle hood structure of any one of the first aspect to the sixth aspect wherein at least a portion of the wavy section is formed at a position facing towards a rigid object inside an engine compartment covered by the hood.

According to the vehicle hood structure of the seventh aspect of the present invention, at least a portion of the wavy section is formed at a position facing towards a rigid object inside an engine compartment covered by the hood. The rigidity of the hood inner panel is therefore raised at the location on the vehicle top side of the rigid object. Accordingly, when the impacting body impacts the hood from the vehicle top side of the rigid object, the penetration amount of the impacting body can accordingly be suppressed since impact energy is absorbed by the wavy section. An eighth aspect of the present invention is the vehicle hood structure according to any one of the first aspect to the seventh aspect wherein a height h of the waveform profile in the wavy section is set such that 8.5 mm≤h≤16.7 mm. A ninth aspect of the present invention is the vehicle hood structure according to any one of the first aspect to the eighth aspect wherein a bottom portion of the concave portion is formed with a curved profile. A tenth aspect of the present invention is the vehicle hood structure according to any one of the first aspect to the ninth aspect wherein elongated hole(s) are formed to pass through the bottom portion of the concave portion, with the elongated hole(s) having a length direction aligned with the extending direction of the bottom portion. An eleventh aspect of the present invention is the vehicle hood structure of the tenth aspect wherein the elongated holes are principally formed in the bottom portions at locations that are positioned facing a rigid object inside an engine compartment covered by the hood and locations where the gap to the rigid object is shorter than at other positions.

Advantageous Effects of Invention

As explained above, according to the vehicle hood structure of the first aspect of the present invention, the excellent advantageous effect is exhibited of enabling the energy absorbing capability during impact of an impacting body to be raised.

According to the vehicle hood structure of the second aspect of the present invention, the excellent advantageous effect is exhibited of enabling the energy absorption amount achieved by the hood inner panel to be increased further due to the flattened portions being formed to the top portions of the protrusion portions.

According to the vehicle hood structure of the third aspect of the present invention, in the wavy section it is possible to further raise the rigidity of the wavy section due to being able to secure the height of the waveform profile while still setting the wavelength p of the waveform profile short. The excellent advantageous effect is accordingly exhibited of enabling the energy absorption capability of the hood inner panel to be increased further.

According to the vehicle hood structure of the fourth aspect of the present invention, due to forming the weakened portion in the bottom portion of the concave portion, the excellent advantageous effect is accordingly exhibited of enabling the hood inner panel to be made to deform comparatively easily when the impacting body has impacted the hood and the hood inner panel has made contact with a member below the hood inner panel.

According to the vehicle hood structure of the fifth aspect of the present invention, the excellent advantageous effect is exhibited of enabling the energy absorption capability of the hood inner panel to be increased further due to forming the protrusion portions along a direction parallel to the hood front-rear direction or a direction at an angle to the hood front-rear direction.

According to the vehicle hood structure of the sixth aspect of the present invention, the excellent advantageous effect is exhibited of enabling the energy absorption capability of the hood inner panel to be increased further due to forming the protrusion portions in a concentric circle pattern centered on the central section side of the hood as seen in plan view or in a pattern radiating out from the central section side.

According to the vehicle hood structure of the seventh aspect of the present invention, at least a portion of the wavy section is formed at a position facing towards a rigid object inside the engine compartment. The energy absorption capability of the hood inner panel at the vehicle top side of the rigid object is accordingly raised, and as a result the excellent advantageous effect is exhibited of enabling the gap between the hood and the rigid object to be made smaller.

BRIEF DESCRIPTION OF DRAWINGS

FIG. 4 illustrates an enlarged cross-section sectioned along line 4-4 of FIG. 1.

BEST MODE FOR CARRYING OUT THE INVENTION

First Exemplary Embodiment

Figure 1:
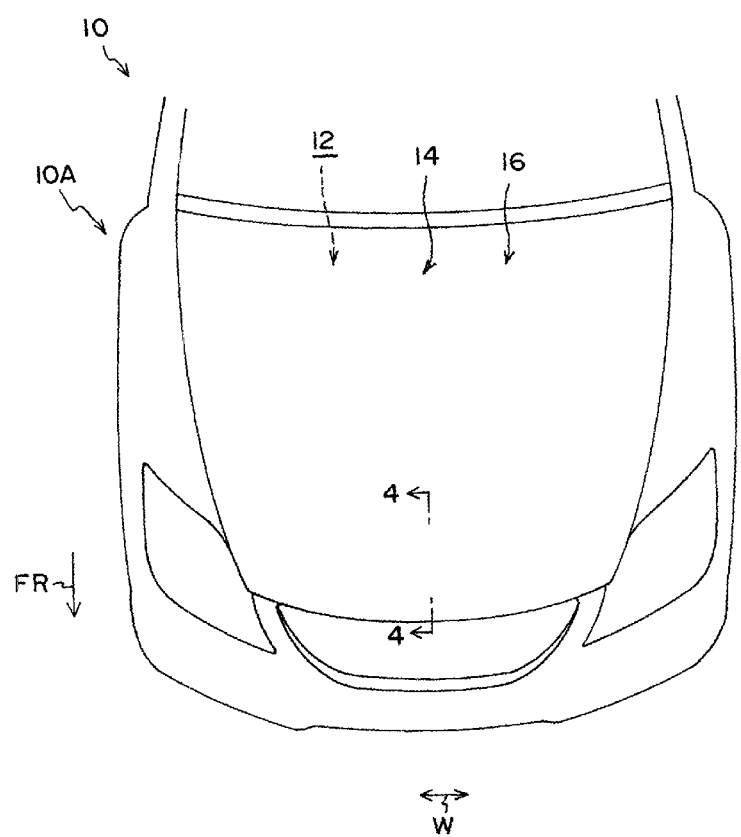
FIG. 1 is a plan view illustrating a front section of a vehicle to which a vehicle hood structure according to a first exemplary embodiment of the present invention has been applied.

Explanation follows regarding a vehicle hood structure according to a first exemplary embodiment of the present invention, with reference to FIG. 1 to FIG. 10. In the drawings the arrow FR indicates the vehicle front-side, the arrow UP indicates the vehicle top side, and the arrows W indicate the vehicle width directions, as appropriate. In a hood closed state the hood front-rear direction is aligned in the same direction as the vehicle front-rear direction, the hood top-bottom direction is aligned in the same direction as the vehicle top-bottom direction, and the hood width direction is aligned in the same direction as the vehicle width direction.

FIG. 1 is a plan view illustrating a vehicle front section to which a vehicle hood structure according to the present exemplary embodiment has been applied. As shown in FIG. 1, a hood (engine hood) 14 is disposed at a vehicle front section 10A of an automobile (vehicle) 10. The hood 14 is capable of opening and closing to cover an engine compartment 12. A rigid object 12A (see FIG. 2B) such as a power unit is installed inside the engine compartment 12 covered by the hood 14.

The hood 14 is made from metal (made from an aluminum alloy in the present exemplary embodiment). The dimension of the hood width direction is set longer than the dimension of the hood front-rear direction, similarly to a normal hood. Hinges (not shown in the drawings) are disposed at the rear end portion of the hood 14 in the hood front-rear direction rear edge portion. The hood 14 is accordingly capable of rotational movement at the hinges (not shown in the drawings) about an axis along the hood width direction, in other words capable of opening and closing. The hood 14 has local reinforcement with hinge reinforcement (not shown in the drawings) provided to the hinge (not shown in the drawings) side (elements falling within the broad definition of "hood attachment members").

Figure 2A:
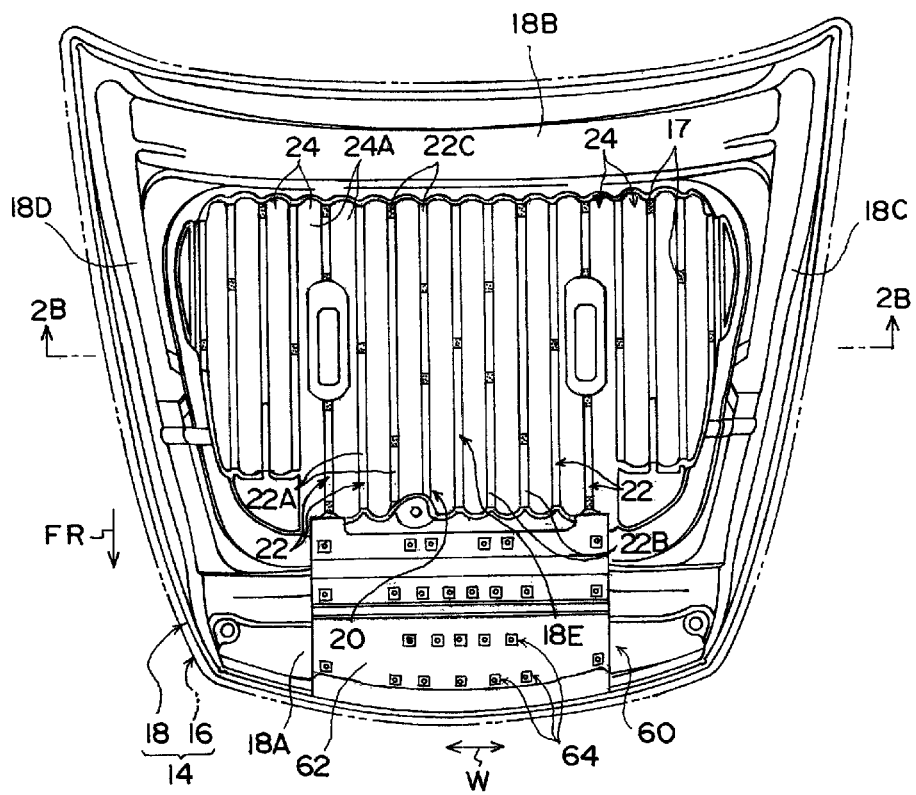
FIG. 2A is a plan view illustrating a hood to which the vehicle hood structure according to the first exemplary embodiment of the present invention has been applied (elements such as the hood outer panel are shown in a see-through state).
Figure 2B:
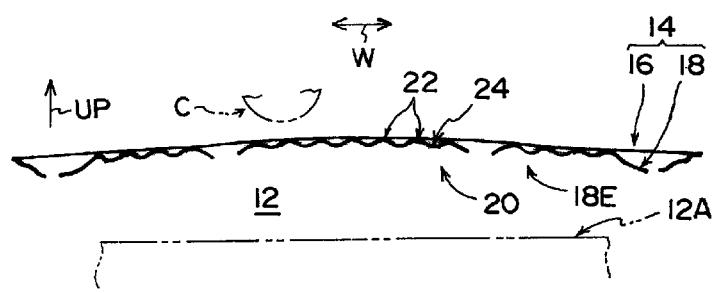
FIG. 2B illustrates a cross-section sectioned on line 2B-2B of FIG. 2A.

FIG. 2A is a plan view of the hood 14 in which a hood outer panel 16 (see the imaginary line) is illustrated in a see-through state. FIG. 2B illustrates a cross-section taken along line 2B-2B of FIG. 2A. The hood 14 illustrated here is configured including the hood outer panel 16 configuring the outer sheet of the hood 14 and extending along substantially the vehicle front-rear direction, and a hood inner panel 18 that is disposed at the hood bottom side with respect to the hood outer panel 16 and is joined to the hood outer panel 16 so as to configure the inner sheet of the hood 14. A dent reinforcement 60 is also disposed at a central region of a hood front-rear direction front edge portion of the hood 14, as shown in FIG. 2A. A striker reinforcement 68 (see FIG. 4) is disposed at the hood bottom side of the dent reinforcement 60.

FIG. 4 is an enlarged cross-section illustrating a cross-section sectioned along line 4-4 of FIG. 1. The striker reinforcement 68 illustrated in FIG. 4 is a bent plate shaped reinforcement member made from metal to secure rigidity surrounding a hood striker 70 disposed between the hood outer panel 16 and the hood inner panel 18. A hood front-rear direction intermediate portion of the striker reinforcement 68 is joined to the hood inner panel 18. Hood front-rear direction end portions of the striker reinforcement 68 are joined to the back face of the dent reinforcement 60 at the hood front-rear direction end portion sides.

The dent reinforcement 60 has a sheet profile and is formed from metal and disposed on the hood outer panel 16 side between the hood outer panel 16 and the hood inner panel 18. The dent reinforcement 60 serves as a reinforcement member for suppressing deformation of the hood outer panel 16 when the hood 14 is being closed. As shown in FIG. 2A and FIG. 4, plural mastic seats 64 are formed to the dent reinforcement 60.

As shown in FIG. 4, the mastic seats 64 are configured as locations where the dent reinforcement 60 rises from an ordinary plane 62 of the dent reinforcement 60 towards the hood outer panel 16 side. The mastic seats 64 are provided with top faces 64A that are a step higher than the ordinary plane 62 of the dent reinforcement 60. The mastic seats 64 are formed with indentation portions 64B at the central side of each of the top faces 64A. The indentation portions 64B of the mastic seats 64 are locations filled with mastic 66 adhesive. Namely, the dent reinforcement 60 extends substantially along the hood outer panel 16 and is also joined (fixed) to a back face 16A of the hood outer panel 16 by the mastic 66.

In the present exemplary embodiment a gap d1 between the top faces 64A of the dent reinforcement 60 and the back face 16A of the hood outer panel 16 is set for example to 3 mm. A gap d2 between the ordinary plane 62 of the dent reinforcement 60 and the back face 16A of the hood outer panel 16 is preferably set to 5 mm or greater. In other words, the height of the mastic seats 64 from the ordinary plane 62 of the dent reinforcement 60 is set to 2 mm or greater. The above settings are made in order to avoid interference between the dent reinforcement 60 and the hood outer panel 16 when joining an inner sub-assembly including the hood inner panel 18 to the hood outer panel 16.

The hood outer panel 16 and the hood inner panel 18 illustrated in FIG. 2A and FIG. 2B are both formed by press forming a sheet of aluminum alloy (in the present exemplary embodiment for example a 6000 series aluminum alloy sheet as defined by JIS). The thickness of the hood outer panel 16 and the thickness of the hood inner panel 18 are set considering several perspectives, including weight reduction and pedestrian protection capability. In the present exemplary embodiment for example the thickness of the hood outer panel 16 is set at 1.1 mm and the thickness of the hood inner panel 18 is set at 0.9 mm. The outer peripheral portion of the hood outer panel 16 is joined to the hood inner panel 18 by hemming. A structure with a closed cross-section (in the present exemplary embodiment this is referred to as an "intermediate structure") is formed by the hood outer panel 16 and the hood inner panel 18 when they are in an assembled state (a state of a panel structural body), with a gap (space) formed between the two panels in the hood top-bottom direction.

As shown in FIG. 2A, an outer peripheral edge portion of the hood inner panel 18 is configured with a front edge portion 18A, a rear edge portion 18B, and two left and right hood width direction edge portions 18C, 18D. A central region 18E is formed at the inside of the front edge portion 18A, the rear edge portion 18B and the two left and right hood width direction edge portions 18C, 18D.

Figure 3:
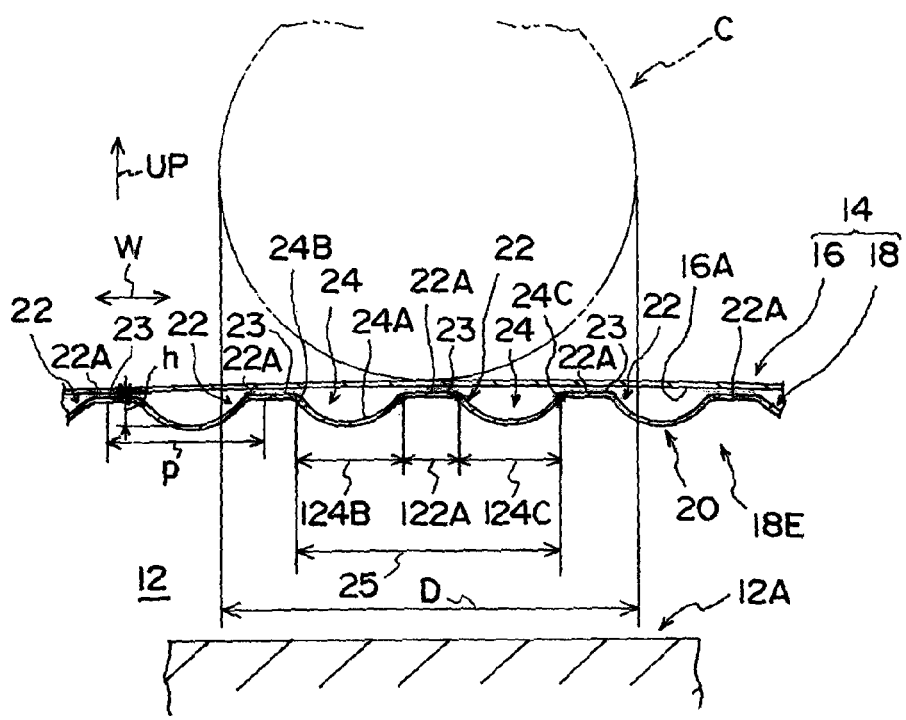
FIG. 3 is a cross-section sectioned along the hood width direction of a hood to which the vehicle hood structure according to the first exemplary embodiment of the present invention has been applied.

Plural beads 22 serving as protrusion portions are formed to the central region 18E of the hood inner panel 18. As shown in FIG. 2B, each of the beads 22 is, as viewed in a cross-section along an orthogonal plane to its length direction, formed with a protruding profile where the panel (the hood inner panel 18) in the central region 18E is raised towards the hood outer panel 16 side so as to provide a top portion 22A, as shown in FIG. 3. Flat profiled flattened portions 23 are formed to the top portions 22A. The front faces of the flattened portions 23 are disposed substantially parallel to the hood outer panel 16 (namely disposed in the plane direction of the plane including a substantially hood front-rear direction and a substantially hood width direction). A gap between the front face of the flattened portions 23 and the back face 16A of the hood outer panel 16 is set to for example 3 mm in the present exemplary embodiment. A portion of the top portions 22A of the beads 22 is joined to the back face 16A of the hood outer panel 16 with mastic 17 adhesive (see FIG. 2A).

In the present exemplary embodiment, as shown in FIG. 2A, each of the beads 22 is formed along a direction parallel to the hood front-rear direction in plan view. Namely, the length direction of each of the beads 22 is aligned with the hood front-rear direction. A front end portion 22B of each of the beads 22 reaches the vicinity of the front edge portion 18A of the hood inner panel 18. A rear end portion 22C of each of the beads 22 reaches the vicinity of the rear edge portion 18B of the hood inner panel 18. The beads 22 configure a framework for raising the hood front-rear direction bending rigidity at the central region 18E of the hood inner panel 18.

The plural beads 22 disposed side-by-side in the central region 18E of the hood inner panel 18 form concave portions 24 having a concave profile on the hood outer panel 16 side between each of the beads 22 and the adjacent bead 22. As shown in FIG. 3, the bottom portion 24A of each of the concave portions 24 is formed as a curved shape (bowed shape) viewed in cross-section. Namely, as viewed in cross-section as shown in FIG. 2A and FIG. 2B, substantially the entire region of the central region 18E is formed by a wavy section 20 configured in a waveform profile (wave form) in which the beads 22 (protrusion portions) and the concave portions 24 are provided alternately along the hood width direction. The wavy section 20 is formed in a position that faces the rigid object 12A inside the engine compartment 12 (see FIG. 2B). In the present exemplary embodiment a gap dimension between the wavy section 20 and the rigid object 12A is set such that the length including the thickness of the hood is about 64 mm.

As shown in FIG. 3, in the present exemplary embodiment the cross-section of the waveform profile of the wavy section 20 is, for example, set such that a width dimension 25 between top portions 22A of the beads 22 formed respectively on the two sides adjacent to a given bead 22 (for example the bead 22 illustrated at the center of FIG. 3) out of the plural beads 22 (protrusion portions) other than the two end beads 22, is set smaller than an external diameter D (diameter 165 mm) of a head impactor C (impacting body) modeled on the head of a pedestrian. Between top portions 22A means the range disposed between the top portions 22A. In other words the above settings mean that the sum of the three width dimensions of a given flattened portion 23 (for example the flattened portion 23 illustrated at the center of FIG. 3) and indentation opening portions 24B, 24C respectively formed at the two sides of and connected to the two sides of the given flattened portion 23, is set smaller than the external diameter (165 mm) of the head impactor C. Reference here to the indentation opening portions 24B, 24C means the opening portions defined by the edge portions on the flattened portion 23 sides of the concave portions 24. In FIG. 3 the width dimension of a given flattened portion 23 is indicated by 122A, the width dimension of the indentation opening portion 24B is indicated by 124B, and the width dimension of the indentation opening portion 24C is indicated by 124C. Note that as an example the width dimension 122A of the top portions 22A is set in the present exemplary embodiment as 17.5 mm.

Detailed structure of the head impactor C is determined by pedestrian head protection performance tests in which the external diameter D (diameter) of the head impactor C is set as a size substantially corresponding to the average external diameter of a human head. The external diameter D (diameter) of the head impactor C illustrated in FIG. 3 is 165 mm as stipulated by International Standards (ISO).

The wavelength p of the waveform profile in the wavy section 20 is preferably set at 70 mm≤p≤88 mm, and in the present exemplary embodiment is set such that p=70 mm. When the top portions 22A are configured with the flattened portions 23 as in the present exemplary embodiment, as shown in FIG. 3, the wavelength p here refers to the horizontal separation distance (hood width direction separation distance) from the width direction central position of a given flattened portion 23 (central position in the wavelength direction) to the width direction central position of the adjacent flattened portion 23 (central position in the wavelength direction).

The height h of the waveform profile of the wavy section 20 (in other words the height of the beads 22) needs to be at least 2 mm, for similar reasons to the reasoning behind the height of the mastic seats 64 from the ordinary plane 62 of the dent reinforcement 60 as illustrated in FIG. 4. Furthermore, in the present exemplary embodiment the height is set such that h=8.5 mm from the perspective of securing rigidity of the wavy section 20 shown in FIG. 3.

Generally the height h here cannot be set high when the wavelength p is set short due to limitations of forming. In the present exemplary embodiment, the wavelength p is set at 70 mm, balancing the consideration that in order to secure the rigidity of the hood inner panel 18 the rigidity of the hood inner panel 18 is raised by making the wavelength p shorter with the consideration that the rigidity is lowered by making the height h lower.

Figure 9:
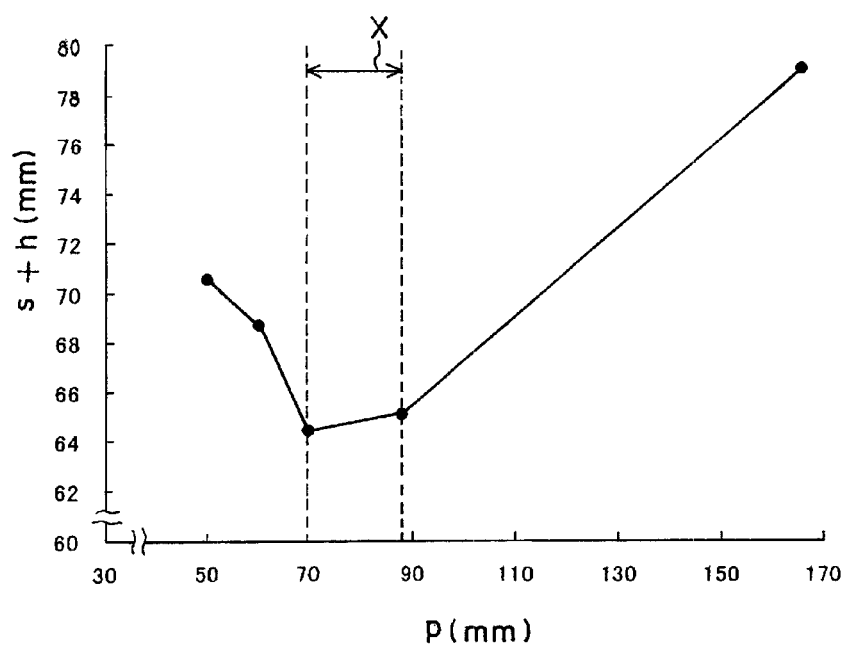
FIG. 9 is a graph illustrating a relationship between the sum of wave height and head penetration amount when a head impactor impacts a hood and wave pitch.
Figure 10:
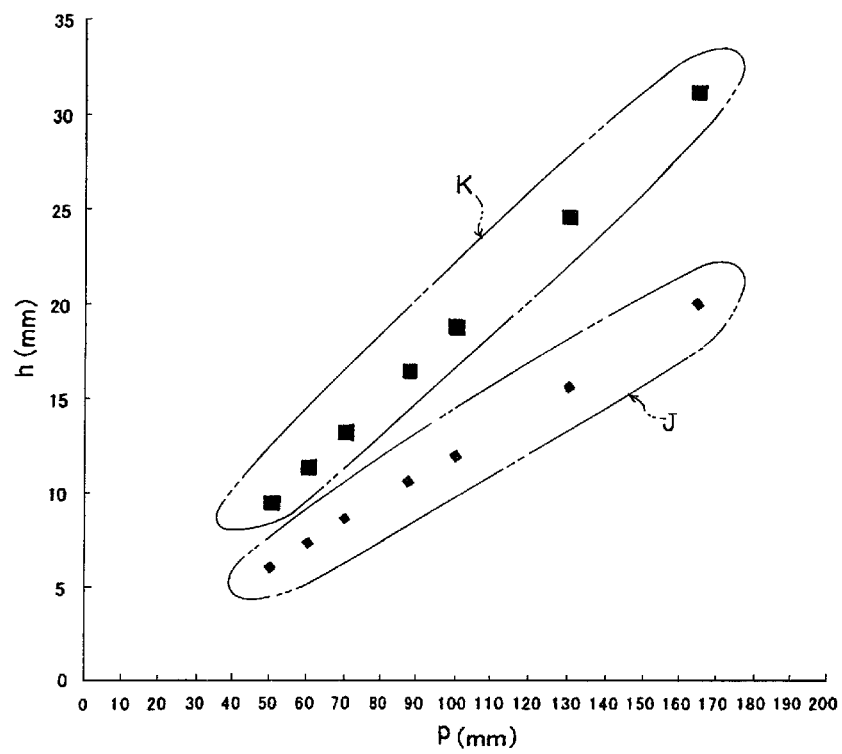
FIG. 10 is a graph illustrating forming limit points of wave height and wave pitch.

Supplementary explanation follows regarding setting the wavelength p and the height h, with respect to FIG. 9 and FIG. 10. In FIG. 9 the horizontal axis shows the wavelength p (wave pitch) of the waveform profile of the wavy section (20), and the vertical axis shows the sum of the penetration amount S (mm) of the head impactor (C) when the head impactor (C) has impacted the hood (14) and the height h of the waveform profile of the wavy section (20). In FIG. 9, smaller values on the vertical axis indicate better pedestrian protection capability. The height h of the waveform profile of the wavy section (20) is the maximum possible setting value (forming limit value) when cold forming at 20° C. As shown in FIG. 9, the vertical axis value is small and there is good pedestrian protection capability when the wavelength p is set 70≤p≤88 (the range indicated by the double-headed arrow X in the drawing).

FIG. 10 is a graph showing the distribution of forming limits, namely the distribution of the maximum values of height h achievable with press forming for a given wavelength p. In FIG. 10 the horizontal axis indicates the wavelength p (wave pitch) of the waveform profile of the wavy section (20) and the vertical axis indicates the height h of the waveform profile of the wavy section (20). The group of points encircled by the chain double-dashed line in region J are test results when cold forming at 20° C. similarly to as in FIG. 9, and the group of points encircled by the chain double-dashed line in region K are test results when hot forming at 250° C.

Note that when an aluminum alloy tensile test sample of similar material to the hood inner panel is employed the elongation percentage when cold forming (20° C.) is 35%, and the elongation percentage when hot forming (250° C.) is 60%. Empirical values with an aluminum alloy sheet member applied to a hood inner panel assuming a conventional structure of wavelength p=165 (mm) and height h=20 (mm) gives an elongation percentage of 13% with cold forming (20° C.). Accordingly, when an aluminum alloy sheet member is applied to a hood inner panel with hot forming (250° C.) the elongation percentage is calculated at 22.3% (=13%×(60%/35%)). The height h is 31.3 (mm) to achieve an elongation percentage of 22.3% when the wavelength p=165 (mm) (see FIG. 10). Hence by hot forming (250° C.) it is possible to set the height h with respect to the wavelength p to achieve the relationship h/p=(31.3/165).

In the present exemplary embodiment the height h is set such that h=8.5 mm, which is the cold forming (20° C.) limit when the wavelength p=70 mm. However, for example with the wavelength p=88 mm, the height h may be set such that h=about 16.7 mm, which is the hot forming (250° C.) limit when the wavelength p=88 mm. In such cases, for example, by setting the width dimension 122A of the flattened portions 23 illustrated in FIG. 3 at 30.1 mm, in the cross-section of the waveform profile of the wavy section 20, the width dimension 25 between top portions 22A of the beads 22 respectively formed adjacent at the two sides of a given bead 22 from the plural beads 22 (protrusion portions) other than the two end beads 22, may be set smaller than the external diameter D (165 mm) of the head impactor C modeled on the head of a pedestrian. As another example, setting may be made such that the wavelength p=8.25 mm, the height h=11.5 mm, and the width dimension 122A of the flattened portions 23 is set at 20 mm.

Operation and Advantageous Effects

Explanation follows regarding operation and advantageous effects of the above exemplary embodiment.

As shown in FIG. 3, in the vehicle hood structure according to the present exemplary embodiment, the wavy section 20 formed to the hood inner panel 18 has a waveform profile provided with the beads 22 formed with a profile protruding to the hood outer panel 16 side and formed with the flattened profile top portions 22A, alternating with the concave portions 24 formed as indentation shapes on the hood outer panel 16 side. The hood inner panel 18 accordingly has a comparatively high rigidity and absorbs energy expended for example in elastic deformation.

In such a cross-section of the waveform profile of the wavy section 20 in the hood inner panel 18, the width dimension 25, between top portions 22A of the beads 22 formed respectively adjacent at the two sides of a given bead 22 from the plural beads 22 (protrusion portions) other than the two end beads 22, is set smaller than the external diameter D (165 mm) of the head impactor C (impacting body) modeled on the head of a pedestrian. The separation between support to the hood outer panel 16 from the hood inner panel 18 is accordingly also narrower (or in other words, the length of the corresponding beamed portions is short). This accordingly makes it easy to secure rigidity of the hood outer panel 16, and the amount of energy absorption by the hood outer panel 16 during the initial impact period is increased by raising the rigidity of the hood outer panel 16.

Figure 5A:
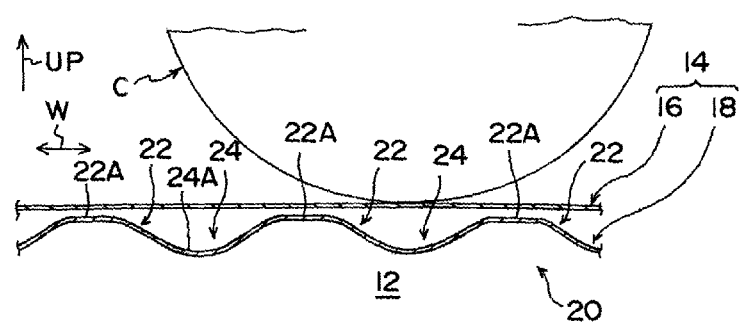
FIG. 5A is a cross-section illustrating a state in which a head impactor has impacted the hood outer panel at the top side between top portions of the hood inner panel.
Figure 5B:
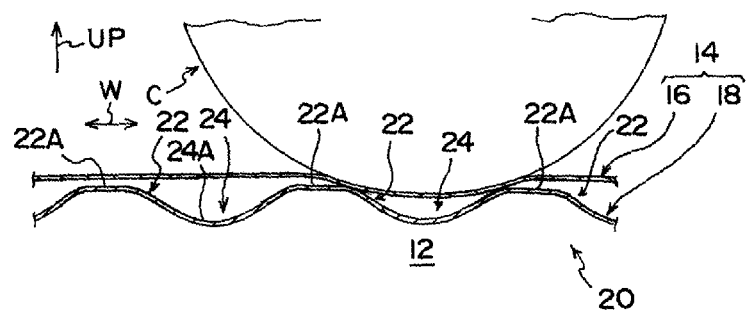
FIG. 5B is a cross-section illustrating a state in which the hood outer panel has bowed from the state illustrated in FIG. 5A.

As shown in FIG. 5A, when the impacting body of the head impactor C impacts the hood outer panel 16 at the top side between top portions 22A of the hood inner panel 18, then, as shown in FIG. 5B, the head impactor C displaces so as to penetrate into the indentation portion 24 as the hood outer panel 16 undergoes bowing deformation. Accordingly, at a comparatively early stage after the hood outer panel 16 starts to bow, the head impactor C contacts and is supported by the hood inner panel 18 through the hood outer panel 16. The contribution made by the hood inner panel 18 to energy absorption during the initial impact period is accordingly raised.

Figure 6A:
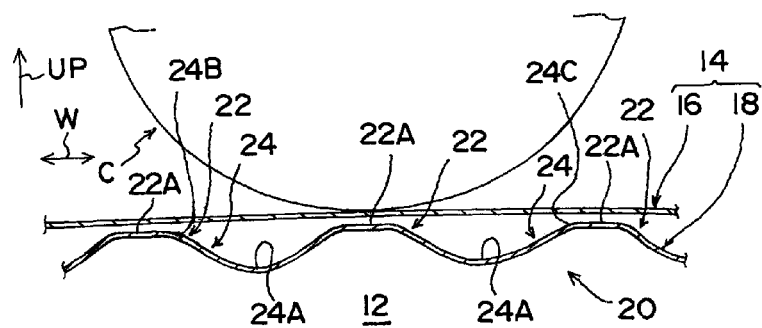
FIG. 6A is a cross-section illustrating a state in which a head impactor has impacted the hood outer panel at the top side of a single top portion of the hood inner panel.
Figure 6B:
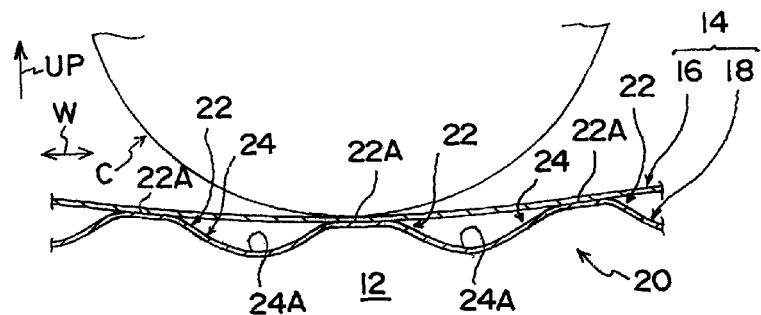
FIG. 6B is a cross-section illustrating a state in which the hood outer panel has bowed from the state illustrated in FIG. 6A.
Figure 6C:
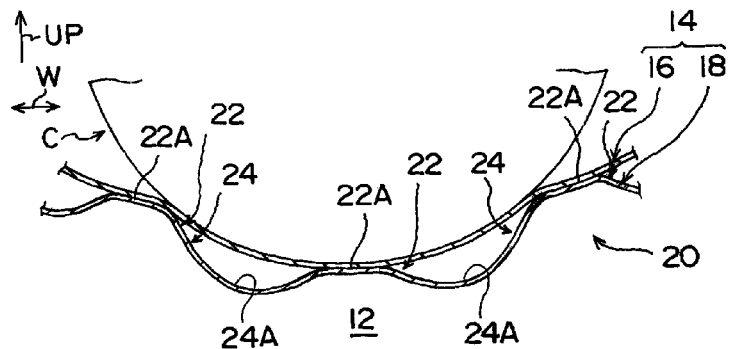
FIG. 6C is a cross-section illustrating a state in which the hood outer panel bowed further from the state illustrated in FIG. 6B.

Furthermore, energy can for example be efficiently absorbed even when the head impactor C has impacted the hood outer panel 16 from the top side at a single top portion 22A of the hood inner panel 18, as shown in FIG. 6A. Namely, in such cases, the hood outer panel 16 and the single top portion 22A of the hood inner panel 18 are first pressed and displaced by the head impactor C, as shown in FIG. 6B. Then, as shown in FIG. 6C, at least in the later impact period, the head impactor C makes contact with and is supported by plural of the top portions 22A through the hood outer panel 16. The duration during which only a single bead 22 bows is accordingly shortened, and the cross-sectional deformation of the bead 22 is suppressed, enabling the energy absorption amount during the later impact period to be increased.

In the vehicle hood structure according to the present exemplary embodiment, the top portions 22A of the beads 22 are formed as flattened portions. Hence the section modulus of the hood inner panel 18 can be raised in comparison to when there are no flattened portions formed to the top portions 22A of the beads 22. The energy absorption amount by the hood inner panel 18 is thereby greater when the head impactor C impacts the hood inner panel 18 at the top side through the hood outer panel 16.

In the vehicle hood structure according to the present exemplary embodiment, the wavelength p of the waveform profile of the wavy section 20 illustrated in FIG. 3 is set at 70 mm. A waveform profile height h of 8.5 mm can therefore be secured by press forming (see FIG. 10), while setting the wavelength p of the waveform profile in the wavy section 20 short, enabling rigidity to be further raised. By securing the rigidity of the wavy section 20, the rigidity of the hood outer panel 16 supported by the wavy section 20 can also be raised, and in combination with bringing forward the timing at which the hood inner panel 18 contributes to energy absorption, high energy absorption is achieved from the initial impact period of the head impactor C. Securing the rigidity of the wavy section 20 makes it more difficult for cross-sectional deformation of the hood inner panel 18 to occur, such that high energy absorption is also achieved in the later impact period of the head impactor C. The pedestrian protection ability provided by the hood 14 can accordingly be raised further.

As shown in FIG. 2A, the beads 22 are formed along a direction parallel to the hood front-rear direction. The central region 18E of the hood inner panel 18 therefore has a higher rigidity in the hood front-rear direction. The rigidity of the hood inner panel 18 to an impact of the head impactor C (see FIG. 2B) is accordingly raised, resulting in a greater amount of energy absorption by the hood inner panel 18.

As shown in FIG. 2B, the wavy section 20 of the hood inner panel 18 is formed at a position that faces the rigid object 12A of the engine compartment 12 covered by the hood 14, thereby raising the rigidity of the hood inner panel 18 at locations on the vehicle top side of the rigid object 12A. Hence, when the head impactor C has impacted the hood 14 at the vehicle top side of the rigid object 12A, the impact energy is absorbed by the wavy section 20, suppressing the penetration amount of the head impactor C.

Explanation follows regarding CA E analysis results confirming the above advantageous effect.

Figure 7:
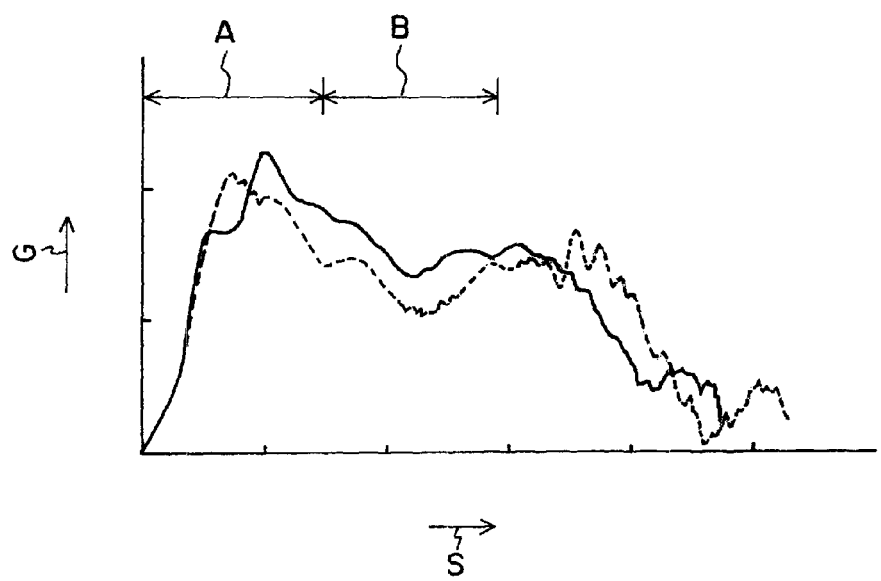
FIG. 7 is a graph showing G-S lines for a vehicle hood structure according to the first exemplary embodiment and for a comparative structure.

FIG. 7 is a graph showing G-S lines for the vehicle hood structure according to the present exemplary embodiment and for a comparative structure, namely showing relationships between generated deceleration G acting on the head impactor when the head impactor has impacted the hood against stroke S. The solid line in FIG. 7 shows the G-S line for the vehicle hood structure according to the present exemplary embodiment, and the intermittent line in FIG. 7 shows the G-S line for the comparative structure. In the comparative structure the central region of the hood inner panel is formed with a sine curve waveform profile set with a wavelength of 165 mm.

As shown in FIG. 7, in the vehicle hood structure according to the present exemplary embodiment, in the initial impact period (region A) and also during the period in the later impact period in which the energy absorption amount is maintained (region B), the generated deceleration is larger than in the comparative structure due to the action described above, in other words the energy absorption amount is greater. As a result the stroke is shorter in the vehicle hood structure according to the present exemplary embodiment than in the comparative structure, and hence a smaller gap can be set between the hood inner panel and the rigid object in the engine compartment.

Figure 8:
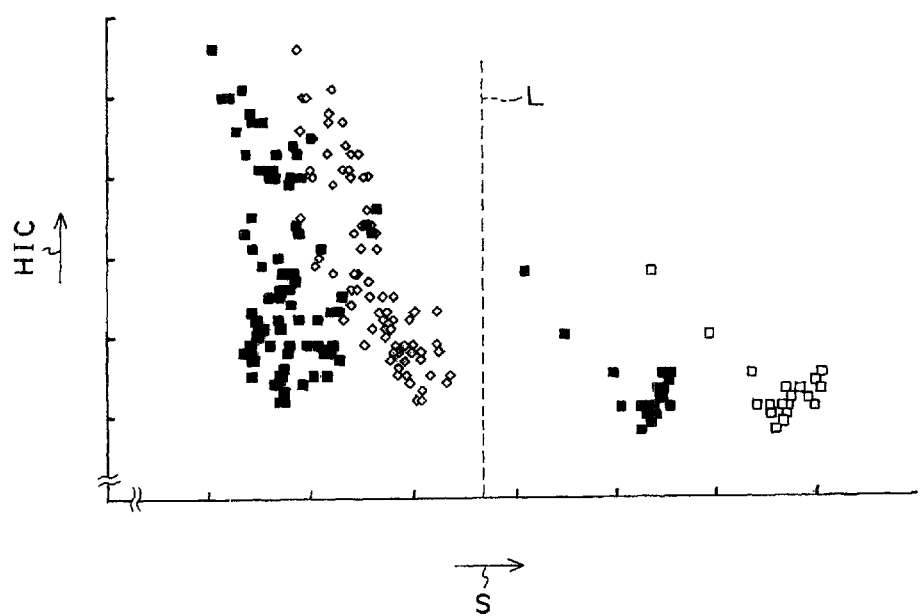
FIG. 8 is a graph illustrating the HIC value and penetration amount when impacted by a head impactor for a vehicle hood structure according to the first exemplary embodiment and for a comparative structure.

FIG. 8 is a graph illustrating the Head Injury Criterion (HIC) value and penetration amount at various points on a vehicle hood structure of the present exemplary embodiment and a hood (central region) according to the comparative structure when a head impactor impact has occurred. The HIC value is shown on the vertical axis, and the penetration amount (stroke) S (mm) of the hood inner is shown on the horizontal axis. Namely, results in the graph plotted further towards the bottom are more favorable, and results plotted further towards the left hand side are also more favorable.

The right hand side of intermittent line L at the center of the graph shows cases in which the head impactor has impacted an area further towards the rear side of the hood than a specific position (adult area). The left hand side of the intermittent line L at the center of the graph shows cases in which the head impactor has impacted an area further towards the front side of the hood than the specific position (child area). The filled in squares in FIG. 8 indicate the results of the vehicle hood structure according to the present exemplary embodiment, and the white squares in FIG. 8 indicate the results of the comparative structure. The comparative structure is a structure similar to the comparative structure for the illustrated results in FIG. 7. As shown in FIG. 8, the vehicle hood structure according to the present exemplary embodiment obtains a more favorable result than the comparative structure wherever the hood is hit by the head impactor (in both the adult area and the child area).

As explained above, according to the vehicle hood structure of the present exemplary embodiment, the energy absorption capability can be raised during the impact of the head impactor C serving as the impacting body as shown in FIG. 3. As a result the gap between the hood 14 and the rigid object 12A inside the engine compartment 12 can be set smaller.

Second Exemplary Embodiment

Figure 11A:
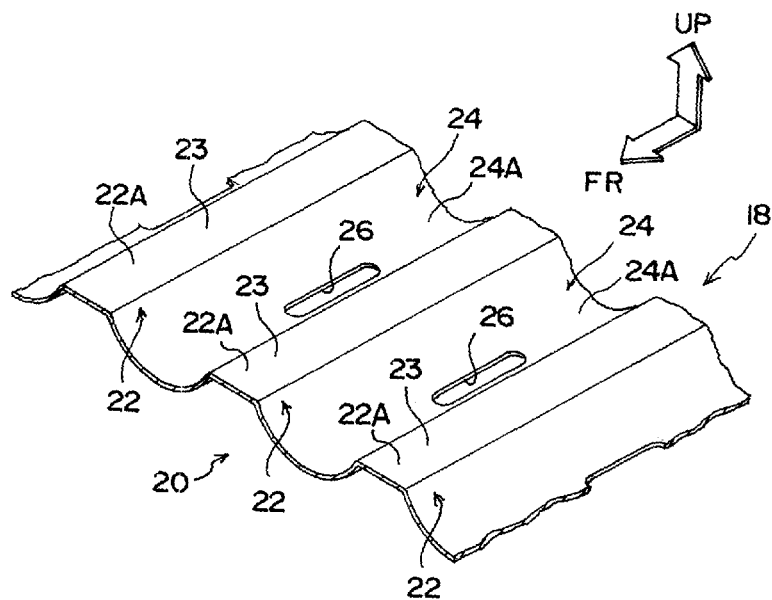
FIG. 11A is a perspective view illustrating a portion of a hood inner panel in a hood applied with a vehicle hood structure according to a second exemplary embodiment of the present invention.

Explanation follows regarding a vehicle hood structure according to a second exemplary embodiment of the present invention, with reference to FIG. 11A to FIG. 13. FIG. 11A shows a perspective view of a portion of a hood inner panel 18 of the vehicle hood structure according to the second exemplary embodiment of the present invention. As shown in FIG. 11A, the present exemplary embodiment differs from the vehicle hood structure of the first exemplary embodiment in the point that elongated holes 26 (elements falling under the broad definition of "through holes") serving as weakened portions are formed through the bottom portions 24A of the concave portions 24. Other parts of the configuration are substantially the same as in the first exemplary embodiment. Accordingly, configuration elements substantially the same as in the first exemplary embodiment are appended with the same reference numerals and further explanation thereof is omitted.

As shown in FIG. 11A, the elongated holes 26 are configured with their length directions aligned with the extension direction of the bottom portions 24A (a direction orthogonal to the wave pitch direction), and are formed with a semicircular profile at both length direction end sides. In the present exemplary embodiment, the length direction dimensions of the elongated holes 26 are set to 60 mm, and the dimensions of the direction orthogonal to the length direction of the elongated holes 26 are set to 10 mm. The elongated holes 26 are principally formed at locations in the bottom portions 24A where there is a short gap before reaching the rigid object 12A (see FIG. 12A) such as a power unit disposed below the bottom portions 24A.

Operation and Advantageous Effects

Figure 12A:
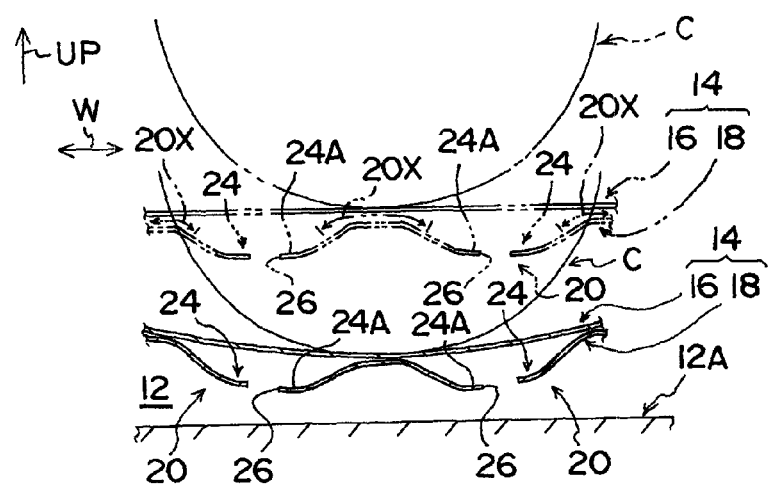
FIG. 12A is a cross-section illustrating a state in which a head impactor has impacted a hood applied with a vehicle hood structure according to the second exemplary embodiment of the present invention.
Figure 12B:
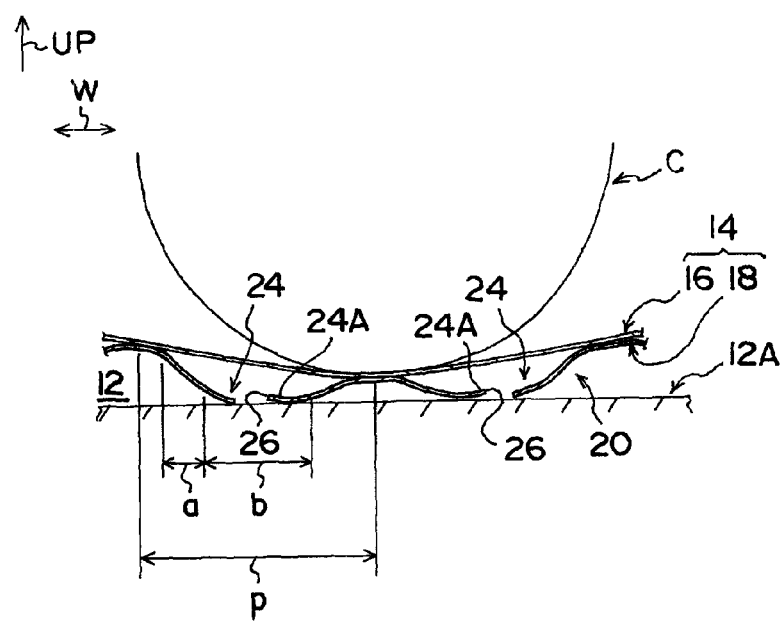
FIG. 12B is a cross-section illustrating a state in which the hood inner panel has bowed further from the state illustrated in FIG. 12A and has contacted a rigid object inside an engine compartment.

Explanation follows regarding operation and advantageous effects of the present exemplary embodiment. Note that FIG. 12A illustrates a state in which the head impactor C has impacted the hood 14. A state during the initial impact period (immediately after impact) is shown by the chain double-dashed line, and a state in which the hood 14 has bowed to a certain extent under the impact load is shown by the solid line. FIG. 12B illustrates a state in which bowing the hood 14 has continued from the state shown by the solid line in FIG. 12A such that the hood inner panel 18 has contacted the rigid object 12A inside the engine compartment 12 (a bottomed out state).

Figure 11B:
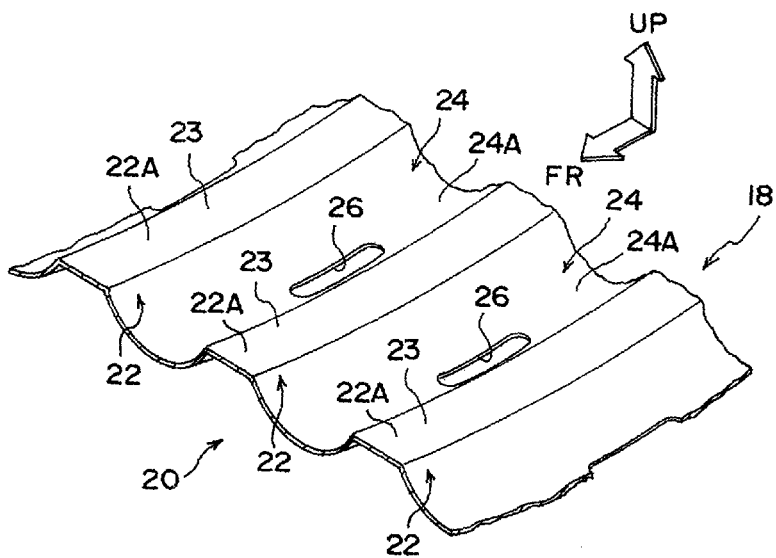
FIG. 11B is a perspective view illustrating a state in which the hood inner panel has bowed from the state illustrated in FIG. 11A.

When the head impactor C illustrated in FIG. 12A impacts the hood outer panel 16, as shown in FIG. 11B, the wavy section 20 deforms so as to bow towards the vehicle bottom side (so as to sink). A compression load tending to induce cross-sectional collapse of the wavy section 20 is consequently generated in a top part of the cross sections shown in FIG. 12A (sections indicated by the arrows 20X). Supposing cross-sectional collapse of the wavy section 20 was to occur at this stage, the rigidity of the hood inner panel 18 would decrease, and the energy absorption efficiency up to the point when the hood 14 bottoms out against the rigid object 12A would decrease.

However, in the present exemplary embodiment, energy loss (a reduction in energy absorption efficiency) is suppressed to a small amount due to the elongated holes 26 being formed in the bottom portions 24A of the concave portions 24. As shown in FIG. 12A, significant deformation of the cross-sectional profile of the hood inner panel 18 is suppressed in the interval from the initial impact period to when the hood 14 bottoms out on the rigid object 12A.

As shown in FIG. 12B, in cases in which the hood 14 subsequently bottoms out against the rigid object 12A, the location (section a) in the wavy section 20 of the hood inner panel 18 rising up from the bottom portion 24A attempts to cave in towards the cross-section inside, and the bottom portions 24A (section b) attempts to bow towards the vehicle top side so as to absorb the excess in cross-section line length. By setting the wavelength p (wave pitch) and the width dimensions of the bottom portions 24A (section b) shorter than in known structures, the bottom portions 24A (section b) bow less readily towards the vehicle top side than in known structures, with the possibility that the wavy section 20 would become more difficult to crush.

However, in the present exemplary embodiment, the elongated holes 26 formed in the bottom portions 24A of the wavy section 20 weaken the bottom portions 24A. Hence after the hood 14 has bottomed out, even though the upright wall portion of the wavy section 20 (see section a) attempts to deform so as to cave in, the bottom portions 24A of the concave portions 24 deform so as to lift up. The excess cross-section line length is thereby absorbed and the wavy section 20 crushes in a desirable manner (achieving a desirable deformation mode).

Namely, energy loss up to the point at which the hood 14 bottoms out against the rigid object 12A is minimized due to forming the elongated holes 26 in the bottom portions 24A (see FIG. 11A), and adequate cross-sectional collapse of the wavy section 20 can be achieved when the hood 14 bottoms out. This advantageous effect is sufficiently exhibited due to principally forming the elongated holes 26 at locations in the bottom portions 24A where the gap to the rigid object 12A is short.

Figure 13:
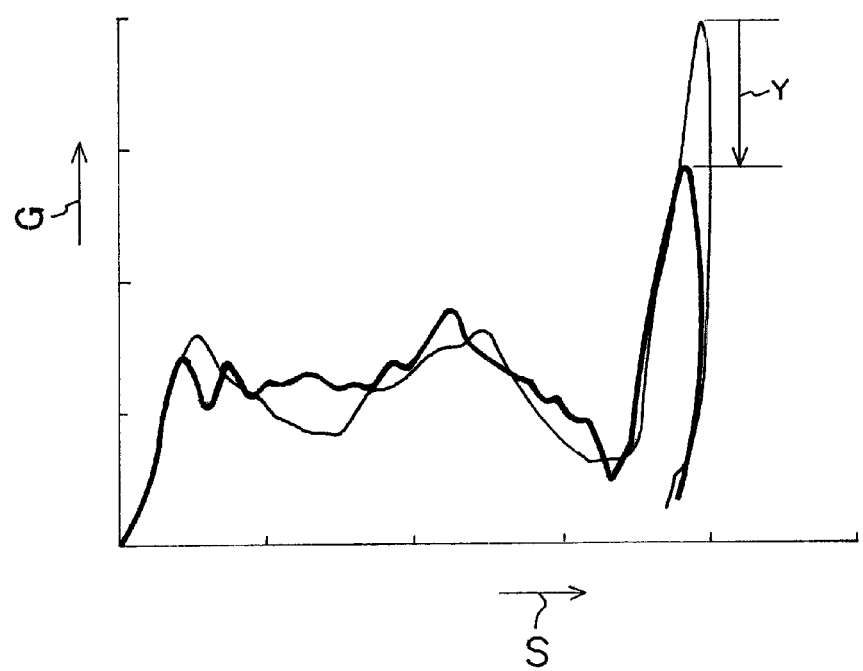
FIG. 13 is a G-S graph illustrating G-S characteristics for both a hood formed with elongated holes in a bottom portions of the hood inner panel and for a hood not formed with the elongated holes.

Explanation follows regarding CAE analysis results confirming the above advantageous effect. FIG. 13 is a shows CAE results for pedestrian protection ability. FIG. 13 is a graph showing G-S lines for the vehicle hood structure according to the present exemplary embodiment and for a comparative structure in which the elongated holes (26) are not formed, namely showing relationships between generated deceleration G acting on the head impactor when the head impactor has impacted the hood against stroke S. The thick line in FIG. 13 shows the G-S line for the vehicle hood structure of the present exemplary embodiment, and the thin line in FIG. 13 shows the G-S line for the comparative structure. As can be understood from FIG. 13, according to the vehicle hood structure of the present exemplary embodiment, the load when the hood bottoms out against the rigid object can be reduced (see arrow Y).

Note that the elongated holes 26 illustrated in FIG. 11A may be configured with other shapes, for example a rectangular shape. The weakened portions formed to the bottom portions 24A may also be configured by other weakened portions in place of the elongated holes 26, for example with circular holes, or localized thin plate portions (thinned portions set with a thinner plate thickness than at other locations).

Third Exemplary Embodiment

Figure 14:
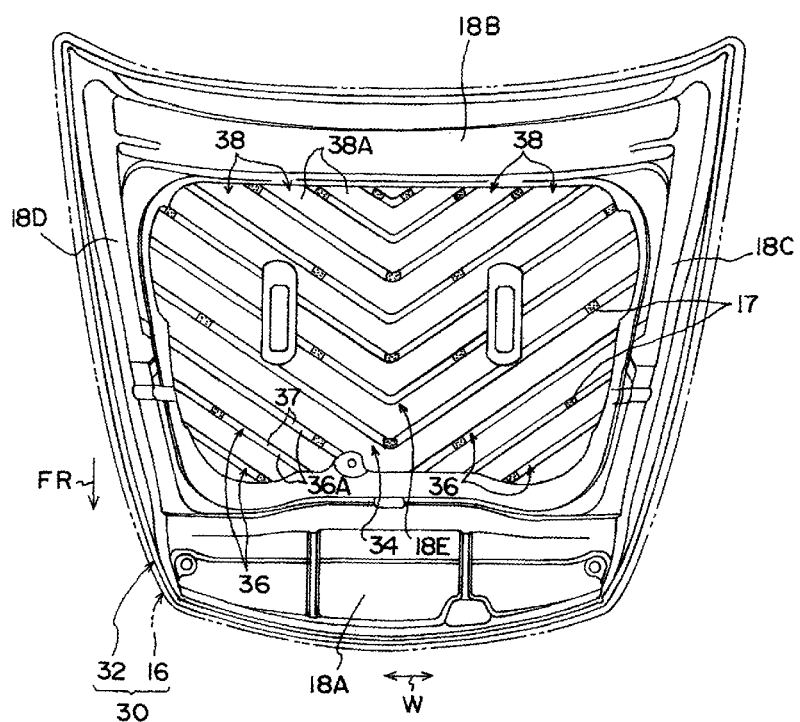
FIG. 14 is a plan view illustrating a hood applied with a vehicle hood structure according to a third exemplary embodiment of the present invention (elements such as the hood outer panel are shown in a see-through state).

Explanation follows regarding a vehicle hood structure according to a third exemplary embodiment of the present invention, with reference to FIG. 14. FIG. 14 is a plan view of a hood 30 according to the third exemplary embodiment of the present invention in which elements such as a hood outer panel 16 (see the imaginary line) are illustrated in a see-through state. As shown in FIG. 14, the hood 30 differs from the hood 14 (see FIG. 2A) of the first exemplary embodiment in the point that plural beads 36 serving as protrusion portions are formed on a hood inner panel 32 along directions at an angle with respect to the hood front-rear direction. Other configurations are substantially the same as in the first exemplary embodiment. Configuration elements substantially the same as in the first exemplary embodiment are accordingly appended with the same reference numerals and further explanation thereof is omitted.

As shown in FIG. 14, the hood inner panel 32 is formed with a wavy section 34 having a waveform profile at a central region 18E, with the wavy section 34 provided with beads 36 having a protruded profile on the hood outer panel 16 side alternating with concave portions 38 having a concave profile on the hood outer panel 16 side. The waveform profile of the wavy section 34 is configured with a similar cross-sectional profile to the wavy section 20 (see FIG. 3). Namely, a flattened portion 37 having a flattened profile is formed to a top portion 36A of each of the beads 36, and bottom portions 38A are each formed with a curved portion and each of the top portions 36A is connected to the bottom portion 38A by an inclined portion. The beads 36 are further formed in a V-pattern open towards the hood rear side as seen in hood plan view.

Similarly to the first exemplary embodiment, the cross-section of the waveform profile of the wavy section 34 (not shown in the drawings) of the hood inner panel 32 is set such that a width dimension between top portions 36A of the beads 36 formed respectively adjacent at the two sides of a given bead 36 out of the plural beads 36 (protrusion portions) other than the two end beads 36, is set smaller than the external diameter (diameter 165 mm) of the head impactor C (see FIG. 3) modeled on the head of a pedestrian. In other words in the cross-section of the waveform profile of the wavy section 20 (not shown in the drawings), setting is made such that the sum of the width dimensions of three portions, these being a given flattened portion 37 and concave opening portions (the opening portions of the concave portions 38) respectively formed at the two sides of and connected to the two sides of the given flattened portion 37, is set smaller than the external diameter (165 mm) of the head impactor C (see FIG. 3). Substantially similar operation and advantageous effects are obtained with such a configuration as in the first exemplary embodiment.

Note that in the present exemplary embodiment the beads 36 are formed in a V-pattern open towards the hood rear side as seen in hood plan view, however the beads serving as protrusion portions may be configured as beads formed in a V-pattern open towards the hood front side as seen in hood plan view. The beads serving as protrusion portions may also be configured as beads formed heading diagonally towards the hood right rear side or heading diagonally towards the hood left rear side (including beads formed on both sides of a hood width direction central portion with left-right symmetry) as seen in hood plan view. The hood inner panel may also employ a combination of beads formed along a direction parallel to the front-rear hood direction and beads formed along a direction at an angle with respect to the front-rear hood direction.

Fourth Exemplary Embodiment

Figure 15:
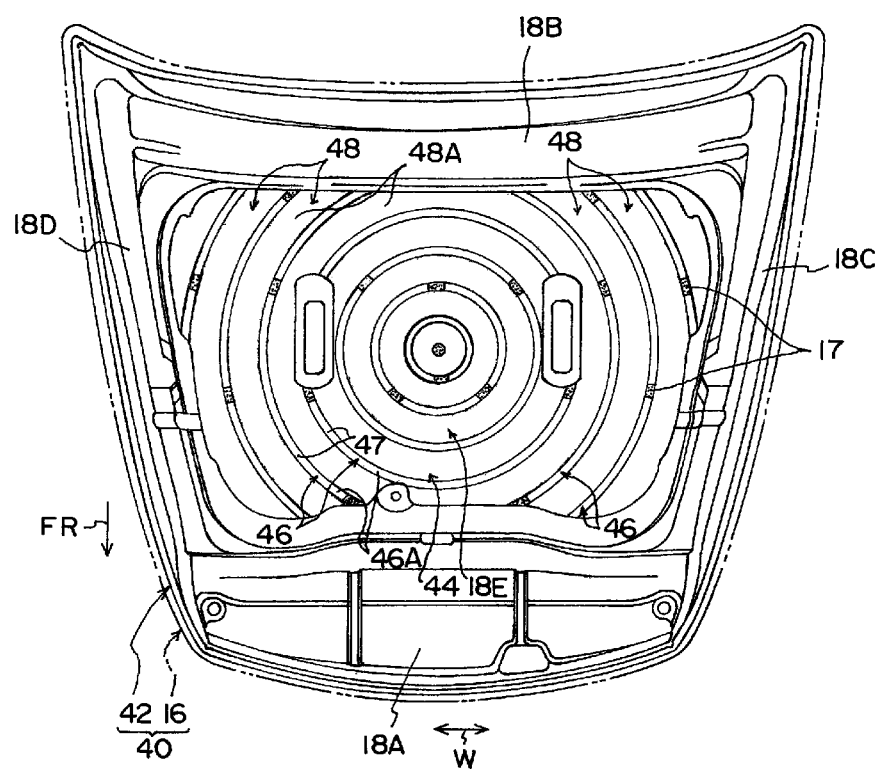
FIG. 15 is a plan view illustrating a hood applied with a vehicle hood structure according to a fourth exemplary embodiment of the present invention (elements such as the hood outer panel are shown in a see-through state).

Explanation follows regarding a vehicle hood structure according to a fourth exemplary embodiment of the present invention, with reference to FIG. 15. FIG. 15 is a plan view of a hood 40 according to the fourth exemplary embodiment of the present invention in which elements such as a hood outer panel 16 (see the imaginary line) are illustrated in a see-through state. As shown in FIG. 15, the hood 40 differs from the hood 14 (see FIG. 2A) of the first exemplary embodiment in the point that beads 46 serving as protrusion portions of a hood inner panel 42 are formed in concentric rings centered around a central portion side as seen in hood plan view. Other configurations are substantially the same as in the first exemplary embodiment. Configuration elements substantially the same as in the first exemplary embodiment are accordingly appended with the same reference numerals and further explanation thereof is omitted.

As shown in FIG. 15, the hood inner panel 42 is formed with a wavy section 44 having a waveform profile at the central region 18E, with the wavy section 44 provided with beads 46 having a protruded profile on the hood outer panel 16 side alternating with concave portions 48 having a concave profile on the hood outer panel 16 side. The waveform profile of the wavy section 44 is configured with a similar cross-sectional profile to the waveform profile of the wavy section 20 (see FIG. 3). Namely, a flattened portion 47 having a flattened profile is formed to a top portion 46A of each of the beads 46, and bottom portions 48A are each formed with a curved portion and each of the top portions 46A is connected to the bottom portion 48A by an inclined portion.

Similarly to the first exemplary embodiment, the cross-section of the waveform profile of the wavy section 44 (not shown in the drawings) of the hood inner panel 42 is set such that a width dimension between top portions 46A of the beads 46 (protrusion portions) respectively formed adjacent at the two sides of a given bead 46 out of the plural beads 46 other than the two end beads 46, is set smaller than the external diameter (diameter 165 mm) of the head impactor C (see FIG. 3) modeled on the head of a pedestrian. In other words in the cross-section of the waveform profile of the wavy section 44 (not shown in the drawings), setting is made such that the sum of the width dimensions of three portions, these being a given flattened portion 47 and concave opening portions (the opening portions of the concave portions 48) respectively formed at the two sides of and connected to the two sides of the given flattened portion 47, is set smaller than the external diameter (165 mm) of the head impactor C (see FIG. 3). Such a configuration can also obtain substantially the same operation and advantageous effects as the first exemplary embodiment.

Fifth Exemplary Embodiment

Figure 16:
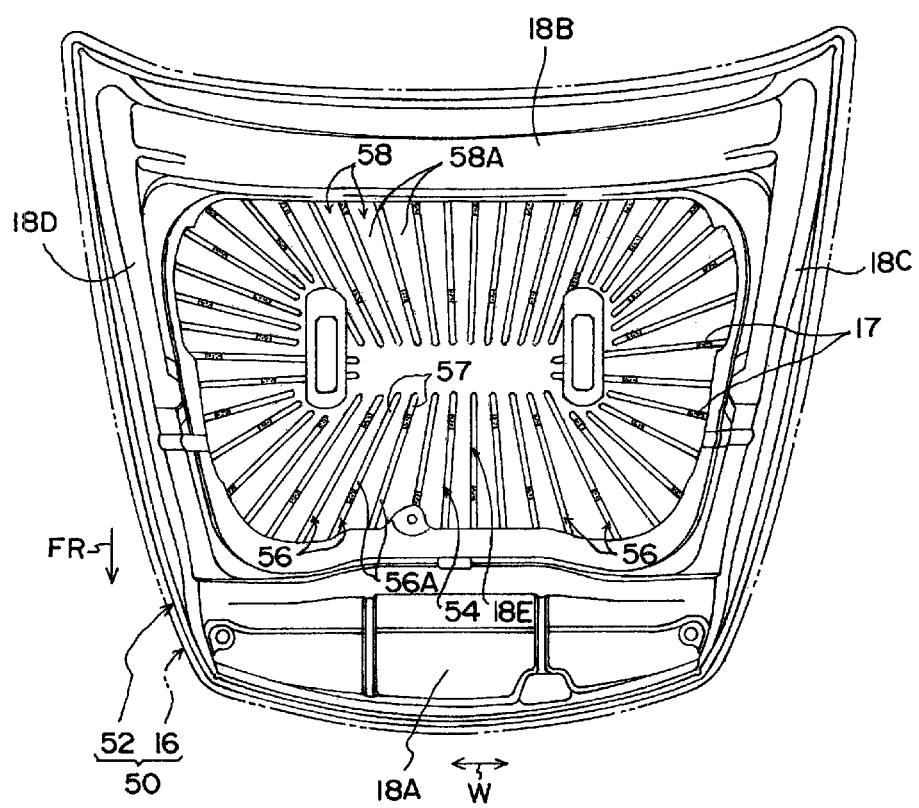
FIG. 16 is a plan view illustrating a hood applied with a vehicle hood structure according to a fifth exemplary embodiment of the present invention (elements such as the hood outer panel are shown in a see-through state).

Explanation follows regarding a vehicle hood structure according to a fifth exemplary embodiment of the present invention, with reference to FIG. 16. FIG. 16 is a plan view of a hood 50 according to the fifth exemplary embodiment of the present invention in which elements such as a hood outer panel 16 (see the imaginary line) are illustrated in a see-through state. As shown in FIG. 16, the hood 50 differs from the hood 14 (see FIG. 2A) of the first exemplary embodiment in the point that beads 56 serving as protrusion portions of a hood inner panel 52 are formed in a radiating pattern from a central portion side as seen in hood plan view. Other parts of the configuration are substantially the same as in the first exemplary embodiment. Configuration elements substantially the same as in the first exemplary embodiment are accordingly appended with the same reference numerals and further explanation thereof is omitted.

As shown in FIG. 16, the hood inner panel 52 is formed with a wavy section 54 having a waveform profile at the central region 18E, with the wavy section 54 provided with beads 56 having a protruded profile on the hood outer panel 16 side alternating with concave portions 58 having a concave profile on the hood outer panel 16 side. The waveform profile of the wavy section 54 is configured with a similar cross-sectional profile to the waveform profile of the wavy section 20 (see FIG. 3). Namely, a flattened portion 57 having a flattened profile is formed to a top portion 56A of each of the beads 56, and bottom portions 58A are each formed with a curved portion and each of the top portions 56A is connected to the bottom portion 58A by an inclined portion.

Similarly to the first exemplary embodiment, the cross-section of the waveform profile of the wavy section 54 (not shown in the drawings) of the hood inner panel 52 is set such that a width dimension between top portions 56A of the beads 56 (protrusion portions) respectively formed adjacent at the two sides of a given bead 56 out of the plural beads 56 other than the two end beads 56, is set smaller than the external diameter (diameter 165 mm) of the head impactor C (see FIG. 3) modeled on the head of a pedestrian. In other words in the cross-section of the waveform profile of the wavy section 54 (not shown in the drawings), setting is made such that the sum of the width dimensions of three portions, these being a given flattened portion 57 and concave opening portions (the opening portions of the concave portions 58) respectively formed at the two sides of and connected to the two sides of the given flattened portion 57, is set smaller than the external diameter (165 mm) of the head impactor C (see FIG. 3). Such a configuration can also achieve substantially the same operation and advantageous effects as the first exemplary embodiment.

Supplementary Explanation of the Exemplary Embodiments

Note that the wavy section (20, 34, 44, 54) may be formed such that the whole of the wavy section (20, 34, 44, 54) is formed at a position facing the rigid object (12A) inside the engine compartment (12) that is covered by the hood (14, 30, 40, 50), or may be formed such that a part of the wavy section (20, 34, 44, 54) is formed at a position facing the rigid object (12A).

The faces configuring the flattened portions (23, 37, 47, 57) are not limited to completely flat, for example horizontal, faces and may be configured from any substantially flat face that functions to support the back face (16A) of the hood outer panel (16). Note that the hood outer panel (16) is usually configured having a gentle curve overall that bulges with a protruded profile towards the hood top side. However, since there are also cases in which the hood outer panel (16) curves in portions gently so as to be concave in towards the hood bottom side, the faces configuring flattened portions (23, 37, 47, 57) are therefore preferably set as faces that although they can be said to be substantially flat, they actually slightly curve so as to follow the curved profile of the back face (16A) of the hood outer panel (16).

The invention claimed is:

1. A vehicle hood structure comprising:
 a hood outer panel configuring that is an outer sheet of the hood structure; and
 a hood inner panel configuring that is an inner sheet of the hood structure, the hood inner panel disposed to a hood bottom side with respect to the hood outer panel and joined to the hood outer panel,
 wherein the hood inner panel is formed by cold-forming a sheet of 6000 series aluminum alloy, as defined by JIS, to include a wavy section having a waveform profile provided with protrusion portions that have a profile protruding towards a hood outer panel side alternating with concave portions that have a concave profile with respect to the hood outer panel side, a height of the waveform profile being set to a forming limit value of the cold-forming,
 wherein in a cross-section of the waveform profile, a width dimension between top portions of the protrusion portions formed respectively adjacent on two sides of a given protrusion portion out of the plurality of the protrusion portions other than opposing end protrusion portions is set to be smaller than an external diameter (165 mm) of a head impactor modeled on a pedestrian head,
 wherein the waveform profile of the wavy section has a wavelength p set such that 70 mm≤p≤82.5 mm.

2. The vehicle hood structure of claim 1, wherein a weakened portion is formed in the bottom portion of each concave portion.

3. The vehicle hood structure of claim 1, wherein the protrusion portions are formed along a direction parallel to a hood front-rear direction or a direction at an angle to the hood front-rear direction.

4. The vehicle hood structure of claim 1, wherein the protrusion portions are formed in a concentric circle pattern centered on a central section side of the hood structure as seen in plan view or are formed in a pattern radiating out from the central section side.

5. The vehicle hood structure of claim 1, wherein at least a portion of the wavy section is formed at a position facing towards a rigid object inside an engine compartment covered by the hood structure.

6. The vehicle structure of claim 1, wherein a height h of the waveform profile in the wavy section is set such that 8.5 mm≤h≤16.7 mm.

7. The vehicle hood structure of claim 1, wherein one or more elongated holes pass through the bottom portion of each concave portion, the one or more elongated holes having a length direction aligned with an extending direction of the bottom portion.

8. The vehicle hood structure of claim 7, wherein the one or more elongated holes are principally formed in bottom portions of concave portions that are positioned facing a rigid object inside an engine compartment covered by the hood structure and formed at locations where a gap from the concave portion to the rigid object is shorter than at other positions.

9. The vehicle hood structure of claim 1, wherein a bottom portion of each concave portion has a curved profile.

10. The vehicle hood structure of claim 1, wherein a top portion of each of the protrusion portions includes a flattened portion, and wherein in the cross-section of the waveform profile a sum of width dimensions, of the flattened portion and two adjacent opening portions of the concave portions that are respectively formed and connected at both sides of the flattened portion, is set smaller than the external diameter (165 mm) of the head impactor.

* * * * *